United States Patent
Krisak et al.

[15] 3,661,399
[45] May 9, 1972

[54] SHAFT SEAL WITH SPLIT SLEEVE

[72] Inventors: Edward J. Krisak; Stephen Strozak, both of Indiana, Pa.

[73] Assignee: FMC Corporation, San Jose, Calif.

[22] Filed: Jan. 13, 1971

[21] Appl. No.: 106,188

[52] U.S. Cl..............................................................277/94
[51] Int. Cl........................................................F16j 15/34
[58] Field of Search....................308/36.1, 36.2; 277/94, 81, 277/95

[56] References Cited

FOREIGN PATENTS OR APPLICATIONS 231,261  2/1911  Germany..................................277/74

Primary Examiner—Martin P. Schwadron
Assistant Examiner—Frank Susko
Attorney—F. W. Anderson and C. E. Tripp

[57] ABSTRACT

A shaft seal of a type suitable for use on marine vessels to enclose a propeller shaft between a stern tube and a propeller hub has a stationary housing fastened to the stern tube, a sleeve split longitudinally into diametrically opposed segments which fit around the propeller shaft and extend from the propeller hub into the stationary housing, and at least one seal element secured circumferentially about the sleeve within the stationary housing.

5 Claims, 3 Drawing Figures

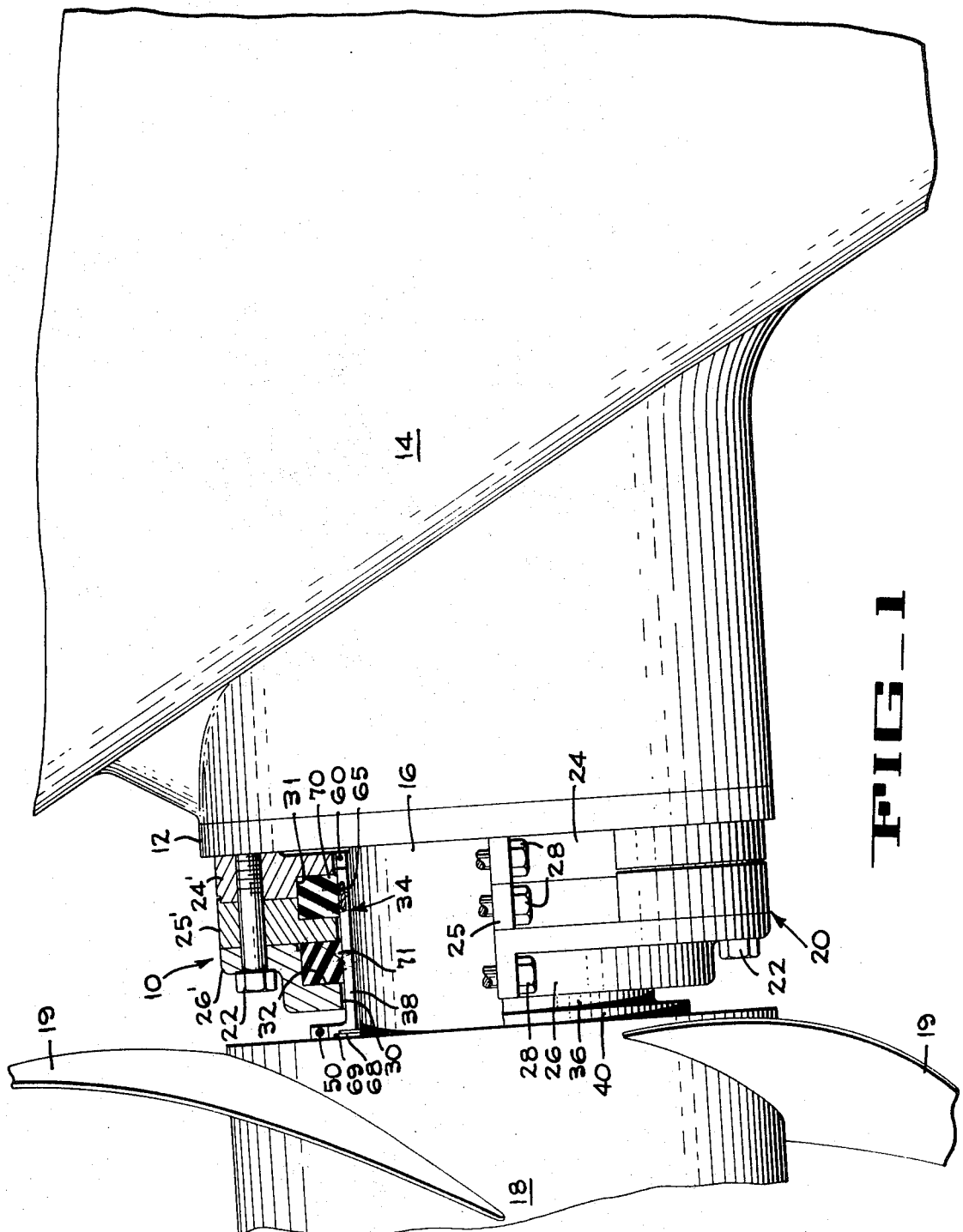

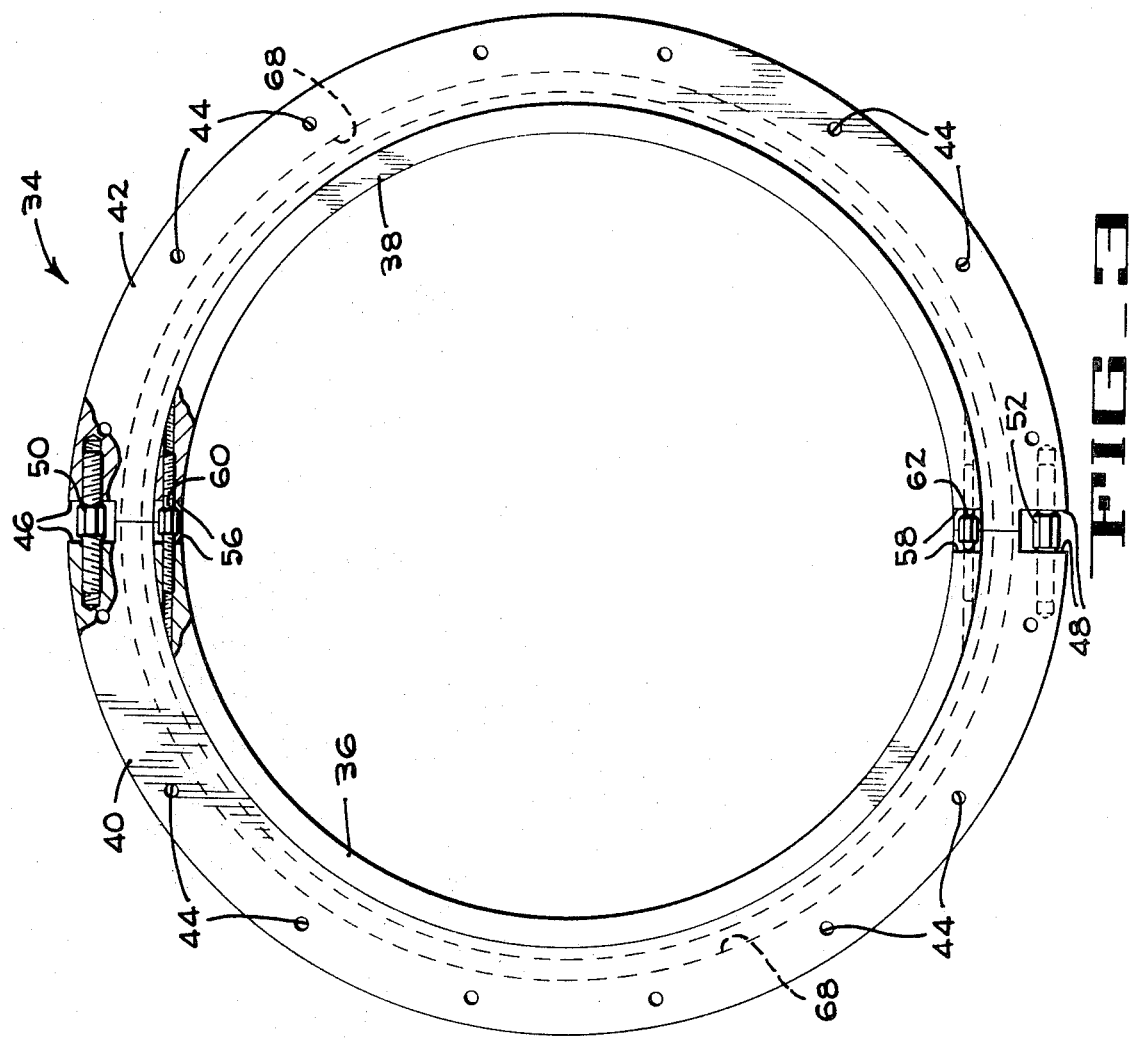
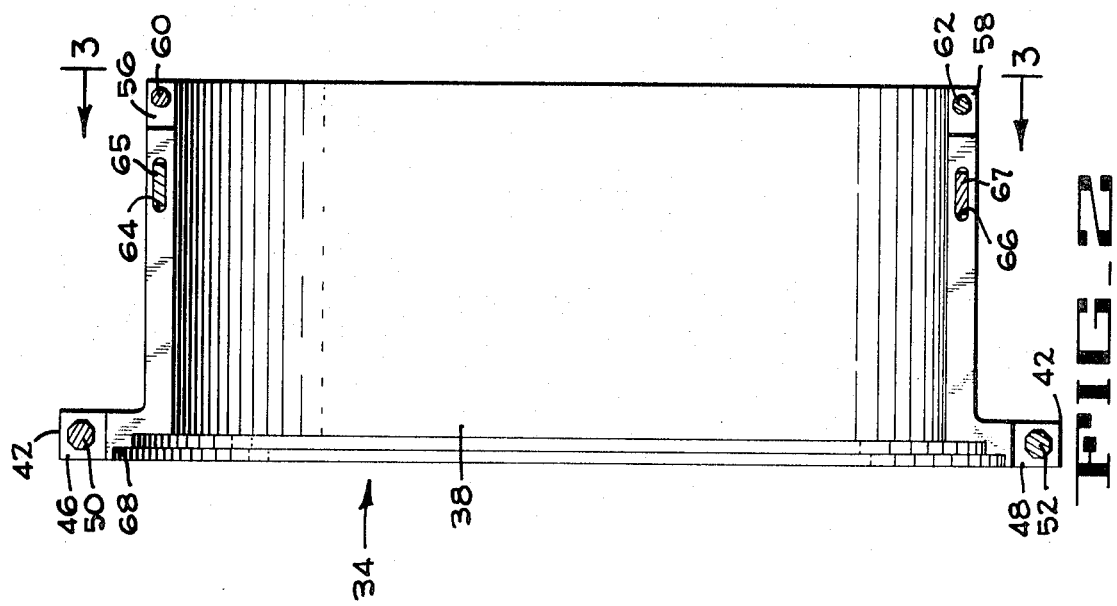

3,661,399

SHAFT SEAL WITH SPLIT SLEEVE

BACKGROUND OF THE INVENTION

1. Field of the Invention

This invention relates to a shaft seal structure including a stationary housing and a rotatable sleeve split longitudinally into diametrically opposed segments for assembly about a shaft.

2. Description of the Prior Art

A marine shaft seal is required to cover an outboard portion of a propeller shaft from a stern tube to a propeller hub to protect the propeller shaft from salt water corrosion. Such seals normally include a stationary housing that fits around the shaft and is coupled to the stern tube. A sleeve fastened to the propeller hub fits around the shaft and extends into the stationary housing wherein a seal element is secured so as to extend circumferentially about the sleeve. Stationary housings have been split longitudinally into diametrically opposed segments to be assembled about the sleeve and thereby facilitates replacement or adjustment of the stationary housing and seal element. The sleeve has previously been made as an integral structure that required removal of the propeller before it could be replaced. In the case of controllable pitch propellers, the tailshaft had to be removed before the sleeve could be replaced. If the seal sleeve is damaged, such as by entanglement with a cable or anchor chain, the ship must be placed in drydock and the propeller or tailshaft removed to replace the seal sleeve. These operations are time consuming and expensive.

BRIEF SUMMARY OF THE INVENTION

A sleeve is split longitudinally into a plurality of diametrically opposed segments that fit about a shaft and can be keyed together for alignment. Double-ended screws are threadably fitted into opposed sleeve segments for fastening the sleeve segments together. Abutting portions of the sleeve segments are milled to form a tight seal when drawn together. A liquid sealant can be applied to the milled abutting portions of the sleeve segments before they are drawn together to insure a fluid tight seal.

BRIEF DESCRIPTION OF THE DRAWINGS

FIG. 1 is a fragmentary elevation view with portions broken away to show underlying structure of a shaft seal embodying the present invention.

FIG. 2 is a longitudinal section view of the seal sleeve shown in FIG. 1.

FIG. 3 is an end view taken on the lines 3—3 of FIG. 2.

DESCRIPTION OF THE PREFERRED EMBODIMENT

Looking now at FIG. 1, a shaft seal 10 is shown mounted aft of a stern tube 12 that extends outboard from a ship's hull 14. A propeller shaft 16 extends from the ship's engine room, through the stern tube and shaft seal, to support a propeller hub 18 having propeller blades 19 projecting outward therefrom. The shaft seal includes a stationary housing 20 fastened to the outboard face of the stern tube by screws 22. The stationary housing is formed by an inner ring 24, an intermediate ring 25 and an outer ring 26. Each ring is split on a horizontal plane into diametrically opposed half segments that are fastened together by bolts 28. The upper half segments that are designated 24, 25 and 26 while the lower half segments are designated by the respective ring numbers. A bore 30 extends longitudinally through the stationary housing and circumferential slots 31 and 32 are defined about the bore by radially extending recesses in the rings which form the stationary housing. These circumferential slots form engagement surfaces for seal elements which will later be described.

Fitted around propeller shaft 16 and fastened to propeller hub 18 by screws, not shown, is a sleeve 34 that extends into bore 30 of stationary housing 20. This sleeve, as shown in FIG. 3, is split longitudinally into two diametrically opposed segments 36 and 38. A coupling flange 40 projects radially outward from one end of sleeve segment 36 and a coupling flange 42 projects radially outward from one end of sleeve segment 38. Holes 44 are provided in coupling flanges 40 and 42 to receive the screws by which the coupling flanges can be fastened to propeller hub 18.

Notches 46 and 48 are provided at opposite ends of coupling flanges 40 and 42 to receive the heads of double-ended screws 50 and 52. The threaded stud portions of double-ended screws 50 and 52 fit into internally threaded openings in the coupling flanges as indicated in FIG. 3. Similarly, at the ends of sleeve segments 36 and 38, opposite from the coupling flanges, notches 56 and 58 are provided and internally threaded openings extend into the flanges therefrom to receive double-ended screws 60 and 62, respectively. Keyways 64 and 66 (FIG. 2) are provided in abutting portions of sleeve segments 36 and 38 to respectively receive keys 65 and 67 therein for holding the sleeve segments in alignment before tightening the double-ended screws.

Abutting surfaces of sleeve segments 36 and 38 are milled to a fine finish and, when drawn together, form a seal. As a further precaution in insuring a water tight seal, a liquid sealant of the self-hardening resin type can be applied to the abutting surfaces of the sleeve segments before they are drawn together. A suitable liquid sealant is sold under the trademark Loctite and manufactured by Loctite Corporation, 115 N. Mountain Rd., Newington, Conn. 06111. A recess 68 (FIG. 2) is provided in sleeve 34 in the faces of coupling flanges 40 and 42 that abut propeller hub 18. An O-ring seal 69, as shown in FIG. 1, fits within the recess and forms a water tight seal when the coupling flanges are fastened to the propeller hub to prevent leakage across the radially extending rear face of the hub.

Mounted on sleeve 34 are a pair of seal elements 70 and 71 that extend radially outward into forward slot 31 and aft slot 32, respectively, These seal elements are rubber rings held in sealing contact with the sleeve by garter rings fitting circumferentially thereabout and the seal elements rotate with the sleeve. Sealing is accomplished by the radial faces of the seal elements against the walls of the slots 31 and 32 within the stationary housing 20, and there are no wearing surfaces on the sleeve or propeller shaft 16. While only the seal elements are shown in the forward and aft slots, it will be understood that hydraulic pressure could be applied to the seal elements on the side opposite from the sleeve, thus compressing the seal elements and forcing the radial faces thereof into tighter dynamic sealing contact with rings 24, 25 and 26 which form the stationary housing.

To install the shaft seal 10, the ship's hull 14 is placed in drydock and the former seal is removed. It is unnecessary to remove propeller hub 18 from propeller shaft 16 because sleeve segments 36 and 38 can be fitted around the propeller shaft. Keys 65 and 67 are fitted into keyways 64 and 66, respectively, to hold the sleeve segments in alignment. Then double-ended screws 50, 52, 60 and 62 are rotated one turn at a time to draw the sleeve segments together. A liquid sealant of the self-hardening type can be applied to the abutting faces of the sleeve segments before the sleeve is assembled.

Sleeve 34 is fastened to propeller hub 18 by inserting screws through holes 44 in coupling flanges 40 and 42. Seal elements 70 and 71 are fastened to the outer surface of sleeve 34 by garter rings, and rings 24, 25 and 26 are fitted about the sleeve and sealing elements. The diametrically opposed half segments of each ring are fastened together by bolts 28 and each ring is fastened to the stern tube by screws 22. Thus, it will be seen that shaft seal 10 can be installed or replaced without removing propeller hub 18 from propeller shaft 16. For ships having a controllable pitch propeller, coupling flanges 40 and 42 of the sleeve would fasten to the tailshaft flange and it would not be necessary to remove the tailshaft to install or replace the seal.

Although the best mode contemplated for carrying out the present invention has been herein shown and described, it will be apparent that modification and variation may be made without departing from what is regarded to be the subject matter of the invention.

What we claim is:

1. A seal for covering a rotatable shaft between a fixed housing from which the shaft extends and a flange projecting radially from the shaft at a location spaced outwardly from the fixed housing, said seal comprising:
   a stationary housing formed by a plurality of rings split longitudinally into a plurality of diametrically opposed segments which are bolted together and fastened to the fixed housing;
   said stationary housing having a bore therein with at least one circumferential slot extending radially outward from the bore;
   a sleeve fitting about said rotatable shaft and having a coupling flange at one end fastened to the radial flange of the shaft while the opposite end of the sleeve extends into the bore of the stationary housing; and
   at least one seal element secured to said sleeve and fitting within the circumferential slot in the stationary housing; said sleeve being split longitudinally into a plurality of diametrically opposed segments that can be assembled about the rotatable shaft.

2. A seal as described in claim 1 wherein said diametrically opposed segments have opposed keyways along abutting portions thereof and at least one key fitting within each pair of opposed keyways to hold the diametrically opposed segments in alignment.

3. A seal as described in claim 2, including a plurality of pairs of double-ended screws having opposite ends threadably fitted into abutting sleeve segments whereupon rotation of the screws in one direction draws the opposed segments together while rotation of the screws in the opposite direction separates the opposed segments.

4. A seal as described in claim 3 wherein said diametrically opposed segments are milled along abutting portions to effect a tight seal when drawn together.

5. A seal as described in claim 4 wherein a liquid sealant is applied to the milled abutting portions of the diametrically opposed segments before they are drawn together.

* * * * *

PO-1050
(5/69)

UNITED STATES PATENT OFFICE
CERTIFICATE OF CORRECTION

Patent No. 3,661,399      Dated July 28, 1972

Inventor(s) EDWARD J. KRISAK ET AL

It is certified that error appears in the above-identified patent and that said Letters Patent are hereby corrected as shown below:

Column 1, line 65, delete "that".

Column 1, line 65, change "24, 25 and 26" to -- 24', 25' and 26' --.

Signed and sealed this 31st day of October 1972.

(SEAL)
Attest:

EDWARD M. FLETCHER, JR.
Attesting Officer

ROBERT GOTTSCHALK
Commissioner of Patents